United States Patent
Chern et al.

(10) Patent No.: US 10,589,615 B2
(45) Date of Patent: Mar. 17, 2020

(54) DECOUPLER FOR A HYDRAULIC ENGINE MOUNT

(71) Applicant: Ford Global Technologies, LLC, Dearborn, MI (US)

(72) Inventors: Jim Chern, Troy, MI (US); Mary Theresa Breida, Ann Arbor, MI (US); Thomas Mathai, Farmington, MI (US); Margaret Brouwer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 14/816,821

(22) Filed: Aug. 3, 2015

(65) Prior Publication Data

US 2017/0036525 A1 Feb. 9, 2017

(51) Int. Cl.
*F16F 13/10* (2006.01)
*B60K 5/12* (2006.01)
*B60K 5/04* (2006.01)

(52) U.S. Cl.
CPC .............. *B60K 5/1208* (2013.01); *B60K 5/04* (2013.01); *F16F 13/106* (2013.01)

(58) Field of Classification Search
CPC . F16F 9/16; F16F 13/10; F16F 13/106; B60K 5/1208; B60K 5/04
See application file for complete search history.

(56) References Cited

U.S. PATENT DOCUMENTS

| | | | |
|---|---|---|---|
| 4,573,567 A * | 3/1986 | Swinderman | B65G 45/00 160/354 |
| 5,704,454 A * | 1/1998 | Kahr | F16D 65/06 188/247 |
| 7,258,331 B2 | 8/2007 | Schneider | |
| 7,475,872 B2 | 1/2009 | Kries et al. | |
| 8,474,799 B2 * | 7/2013 | Michiyama | F16F 13/106 267/121 |
| 9,695,902 B2 * | 7/2017 | Kadowaki | B60K 5/1208 |
| 2004/0212133 A1 * | 10/2004 | Thomazeau | F16F 13/106 267/140.13 |
| 2006/0097436 A1 | 5/2006 | Yamamoto | |
| 2009/0001639 A1 * | 1/2009 | Muraoka | F16F 13/106 267/140.13 |
| 2009/0140476 A1 * | 6/2009 | Michiyama | F16F 13/106 267/121 |
| 2012/0018936 A1 * | 1/2012 | Ogasawara | F16F 13/106 267/140.13 |

(Continued)

FOREIGN PATENT DOCUMENTS

JP 59151643 A * 8/1984
JP 3168438 A * 7/1991

(Continued)

OTHER PUBLICATIONS

English Machine Translation of JP-3168438 (Year: 1991).*

*Primary Examiner* — Melody M Burch
(74) *Attorney, Agent, or Firm* — Geoffrey Brumbaugh; McCoy Russell LLP (57) ABSTRACT

Methods and systems are provided for reducing NVH resultant from collisions between internal components of a hydraulic engine mount. In one example, a hydraulic engine mount may include a de-coupler with a number cavities encased therein and extending along a common circumference of the de-coupler.

20 Claims, 6 Drawing Sheets

(56) References Cited

U.S. PATENT DOCUMENTS

| | | | |
|---|---|---|---|
| 2012/0074629 A1 | 3/2012 | Yamamoto et al. | |
| 2012/0299229 A1* | 11/2012 | Kubo | F16F 13/106 267/140.13 |
| 2013/0015614 A1* | 1/2013 | Bradshaw | F16F 13/16 267/140.13 |
| 2013/0154171 A1* | 6/2013 | Nishi | F16F 13/106 267/140.13 |
| 2013/0292889 A1 | 11/2013 | Power | |

FOREIGN PATENT DOCUMENTS

| | | | | |
|---|---|---|---|---|
| JP | 3168438 A | * | 7/1991 | |
| WO | WO-2014098148 A1 | * | 6/2014 | F16F 13/106 |

* cited by examiner

DECOUPLER FOR A HYDRAULIC ENGINE MOUNT

FIELD

The present description relates generally to methods and systems for a hydraulic engine mount.

BACKGROUND/SUMMARY

Vehicles with internal combustion engines may include noise dampening support structures, often referred to as engine mounts, which mechanically couple the vehicle powertrain to a vehicle frame. Engine mounts may include a rigid support element that is coupled to the engine at a first end, and coupled to a damping element of the engine mount at a second end. The damping element may be mechanically coupled to the vehicle frame. Vibrations from the engine are transferred to the damping element via the support element, and the magnitude of the vibrations are reduced via the damping element, thereby reducing NVH of the vehicle.

One example mount is a hydraulic engine mount, sometimes referred to as a hydraulic mount, an engine hydromount or hydromount. The damping element of a hydraulic mount may comprise an outer housing for two hydraulic chambers that are filled with a working fluid for dampening vibrations. The hydraulic chambers within the outer housing may be separated by a partitioning structure, which may include a throttle passage formed from components included therein. The throttle passage may be formed within first and second partitioning plates that house a fluidic de-coupler. The de-coupler may be configured to absorb at least a portion of the energy within the working fluid that travels through the throttle passage, and to direct the working fluid through one of a number of passageways based on the amplitude of vibrations within the fluid. However, during conditions wherein higher amplitude vibrations (e.g., vibrational amplitudes within one or more amplitude ranges above a threshold amplitude) are present, the de-coupler may come into contact with the first and second partitioning plates. These fluid-structure interactions, and the resultant "clattering" of the de-coupler, may cause NVH that is undesirable for the vehicle operator.

Other attempts to address de-coupler clatter within a hydraulic mount include modifying the de-coupler to reduce an area of contact between the upper and lower surfaces of the de-coupler and the partitioning plates. One example approach is shown by Power in U.S. 2013/0292889. Therein, a de-coupler includes non-planar faces including a plurality of peaks and troughs extending from the oval-shaped perimeter to an interior of the de-coupler body.

However, the inventors herein have recognized potential issues with such systems. As one example, the irregular de-coupler design may increase manufacturing costs of the hydraulic mount. Additionally, the irregularity of the design may introduce operational inconsistencies between different hydro mounts, and thus the noise-mitigating effects of any specific de-coupler including the irregular design may not be consistent and/or predictable. Furthermore, the inventors herein have identified that additional clatter may arise from resonant vibrations within the de-coupler. Thus, the irregular de-coupler design of Power may not address all sources of hydromount clatter.

In one example, the issues described above may be addressed by a hydraulic engine mount, comprising: a high pressure working chamber and a low pressure compensating chamber with a partitioning structure coupled therebetween, a throttle passage coupling the working chamber and the compensating chamber, and a fluidic de-coupler positioned within the throttle passage and housed between first and second plates and including a plurality of discrete, partially annular cavities encased therein and located along a common circumference. In this way, NVH arising from de-coupler clatter may be reduced while maintaining consistent powertrain noise damping effects within the vibrational frequency ranges that the hydraulic mounts have been tuned to dampen.

As one example, the cavities may be included within the de-coupler at diametrically opposed angular positions. Additionally, flushly fitting metallic inserts may be included within each of the cavities to further reduce the prevalence of clattering noises (e.g., by increasing the inertia of the de-coupler). Additionally, by modifying the de-coupler to have a less uniform mass distribution while maintaining a circular structure, the resonant responses of the de-coupler may be reduced while maintaining predictable fluid flow through the throttle passage that includes the de-coupler.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-5B are shown to scale, although other relative dimensions may be used, if desired.

DETAILED DESCRIPTION

Figure 2:
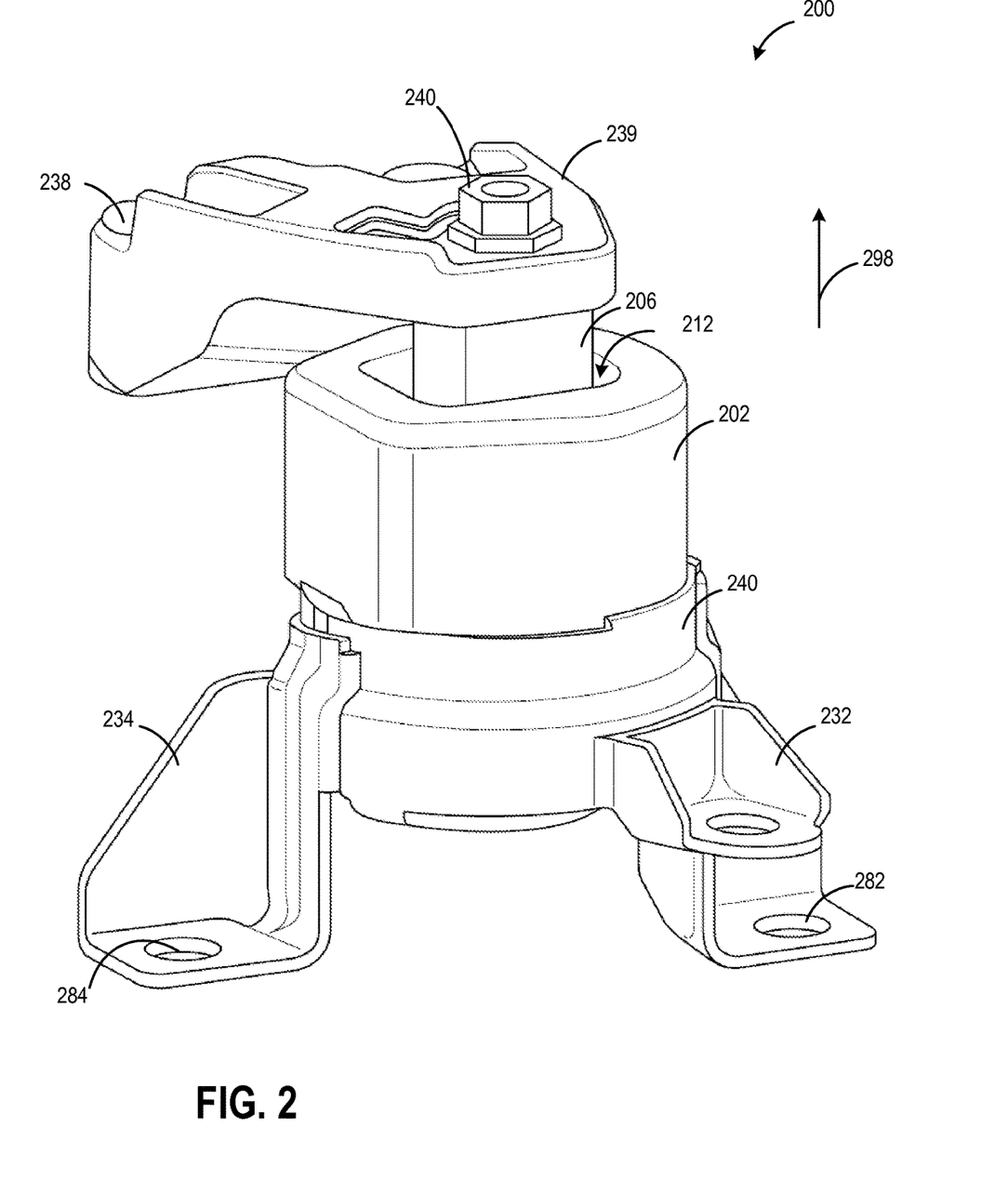
FIG. 2 shows an external view of a hydraulic mount that may be included within the vehicle of FIG. 1.
Figure 3:
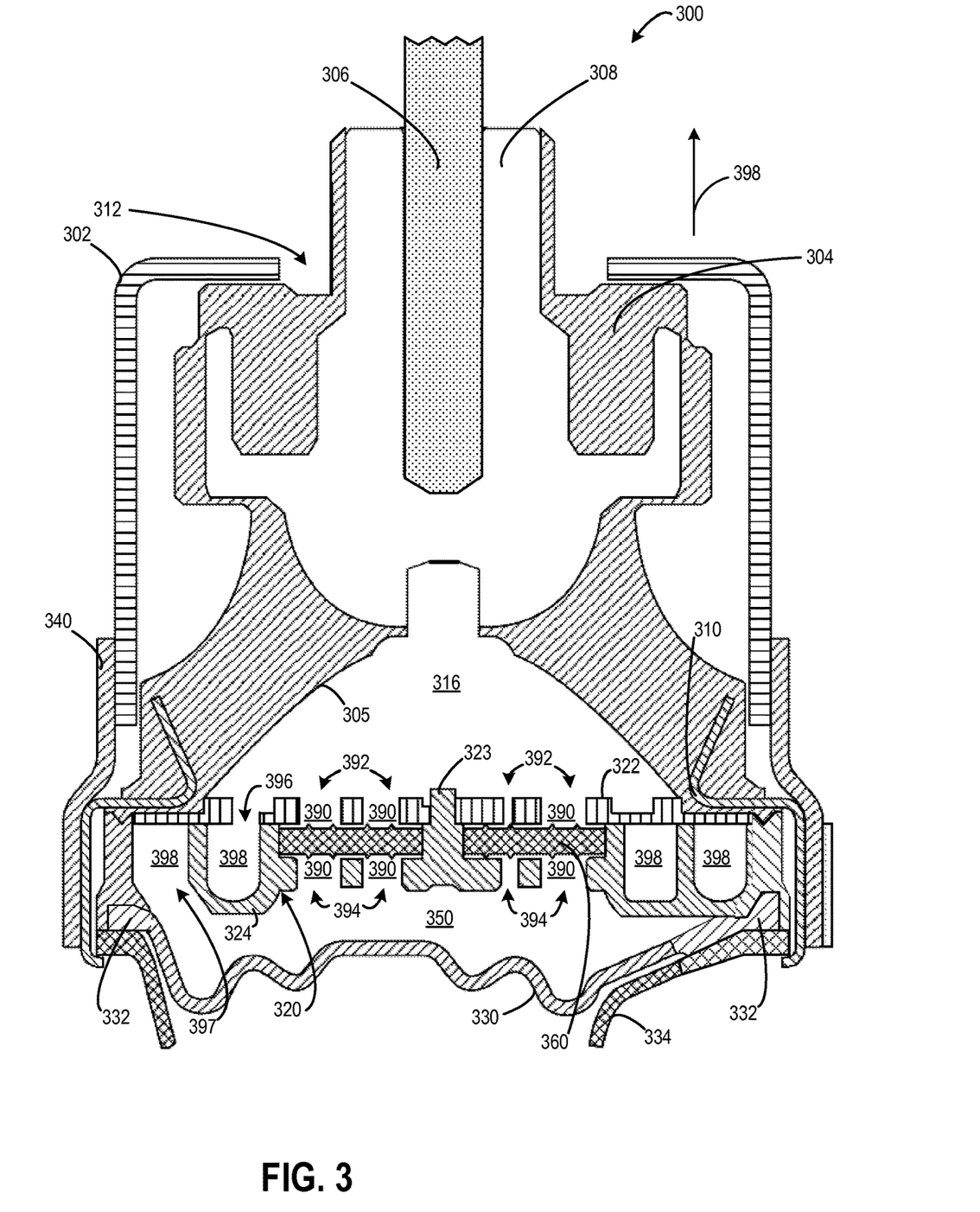
FIG. 3 shows a cross-sectional view of the hydraulic mount shown at FIG. 1, including a de-coupler element.
Figure 4:
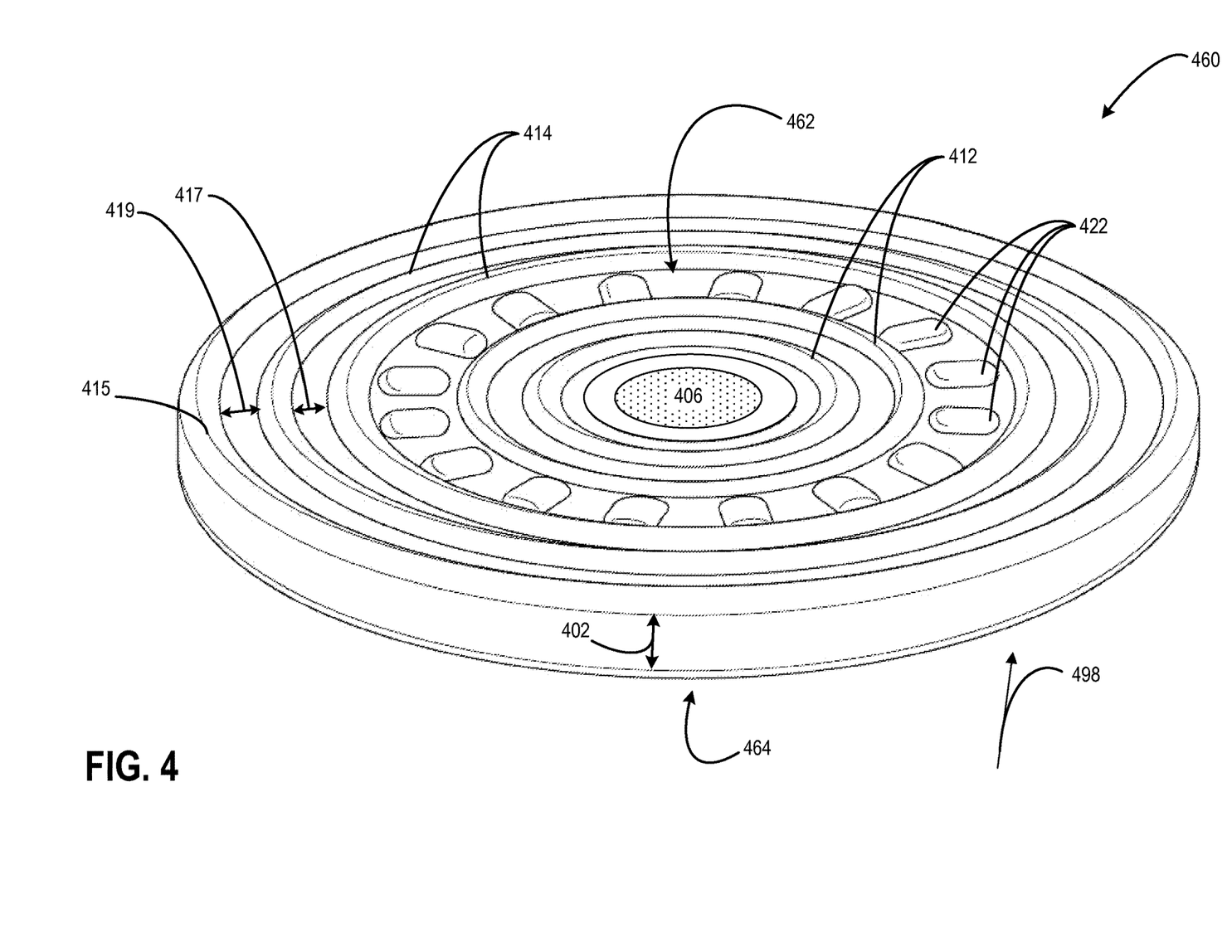
FIG. 4 shows an example perspective view of a de-coupler that may be included in the hydraulic mount of FIG. 3.
Figure 5A:
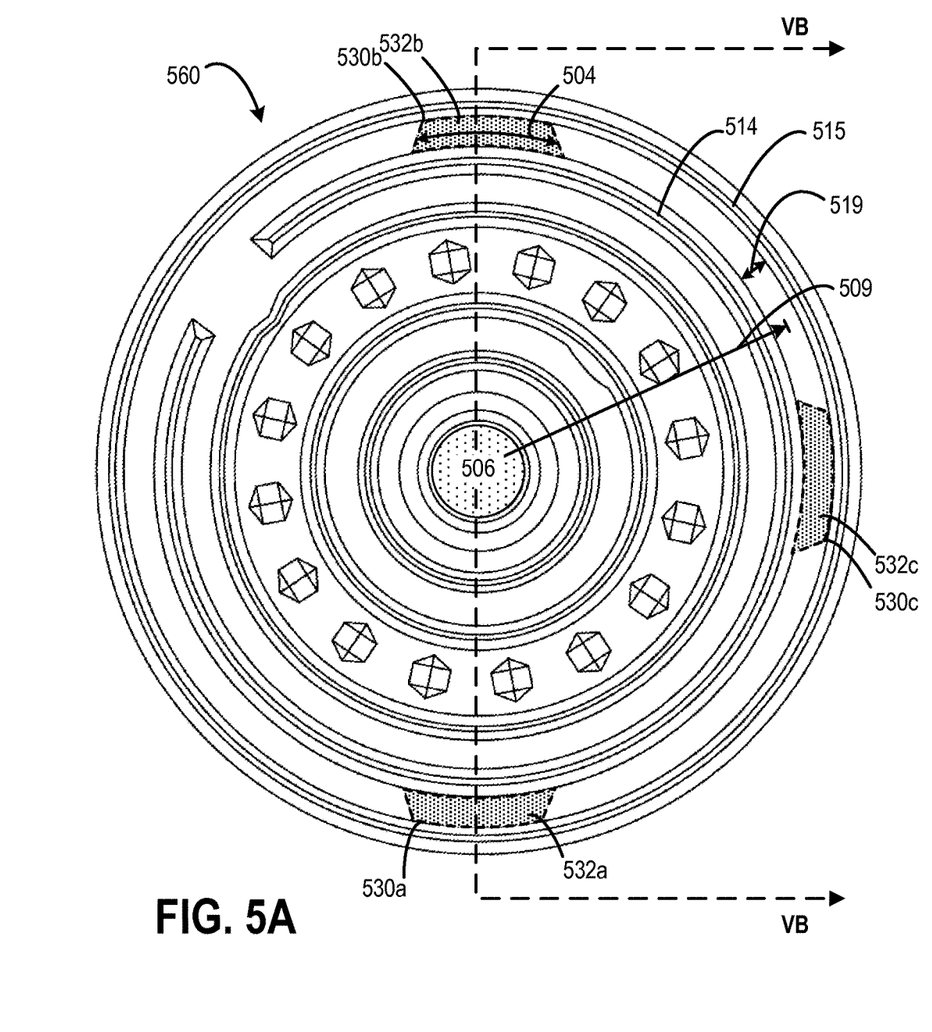
FIG. 5A depicts the de-coupler of FIG. 4 including a plurality of cavities encased within the de-coupler body.
Figure 5B:
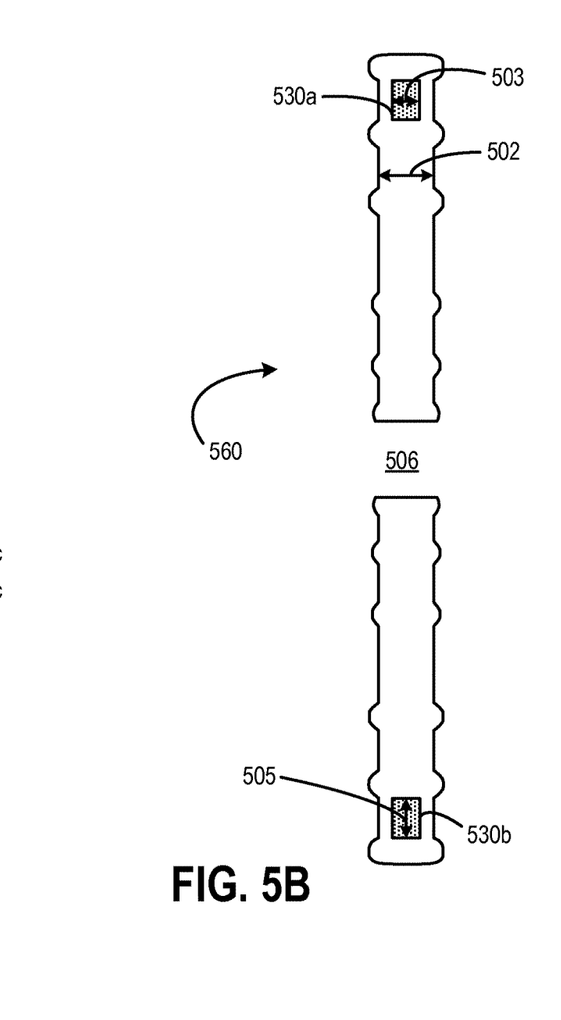
FIG. 5B shows a cross-sectional view of the de-coupler of FIGS. 4-5A.
Figure 6:
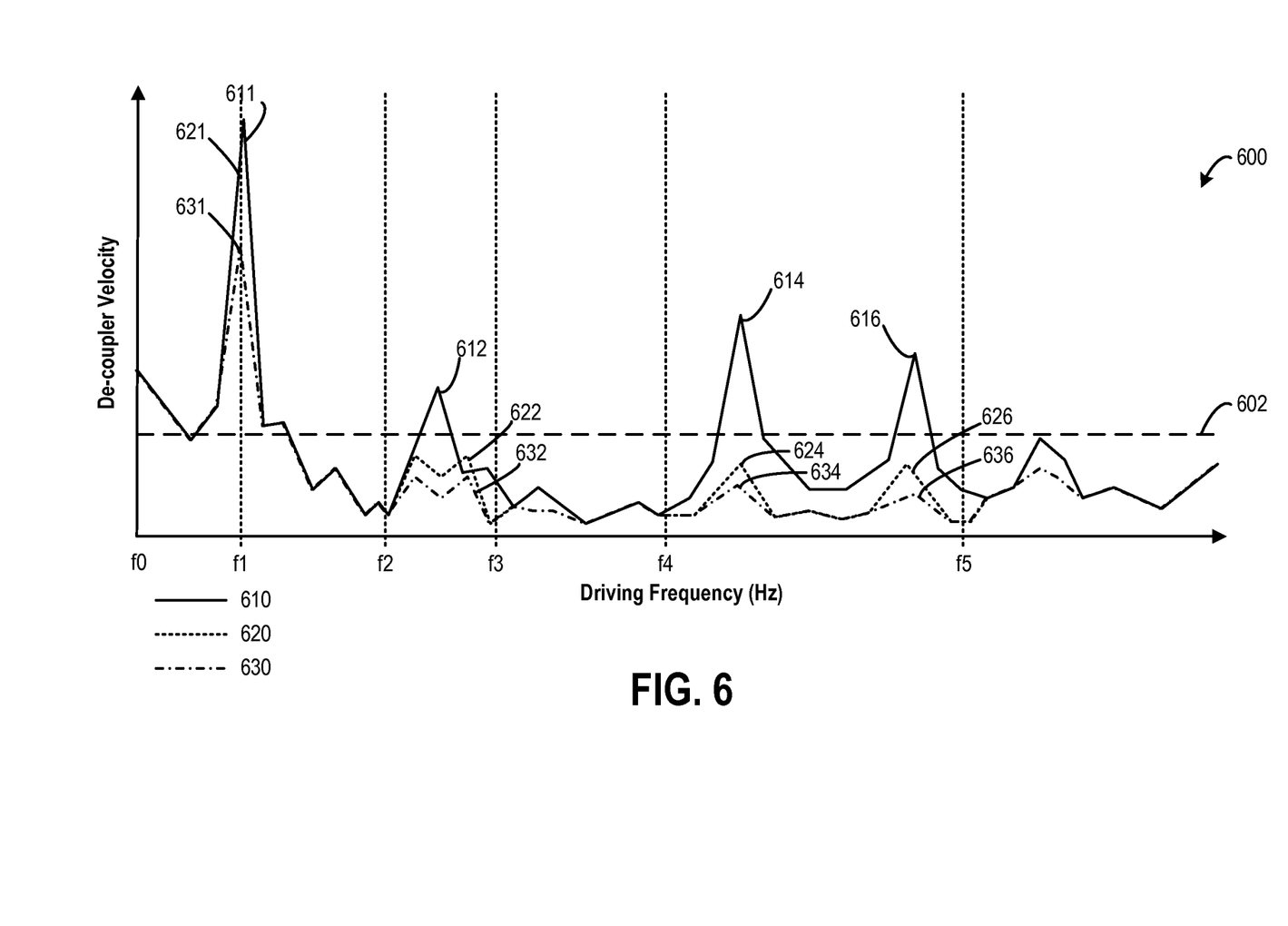
FIG. 6 shows a prophetic example of de-coupler movement as a function of vibrational frequency.

The following description relates to systems and methods for reducing the NVH of a vehicle system. A vehicle powertrain system may be supported in a vehicle by a plurality of hydraulic mounts (FIG. 1) that may be configured to smoothen vibrations resulting from engine operation and road conditions. The hydraulic mount may include a rigid support member coupled to the powertrain system, and a rigid external housing coupled to a vehicle frame (FIG. 2). Within the rigid outer housing, the hydraulic mount may include a number of elastic components forming a high pressure chamber and a low pressure chamber fluidically separated by a partitioning structure (FIG. 3). The partitioning structure may include a fluidic de-coupler that is configured to direct fluid based on the amplitude of vibrations received by the mount (FIG. 4). Some vibrations within specified frequency ranges may cause the de-coupler to collide with the partitioning structure. FIG. 5 shows a de-coupler including a plurality of partially annular cavities and metallic inserts designed to alter the response of the de-coupler to vibrations within the specified frequency ranges. As a result, the de-coupler may include a reduced response to vibrations, thereby resulting in reduced noise associated with clatter between the de-coupler and the partitioning structure (FIG. 6).

Figure 1:
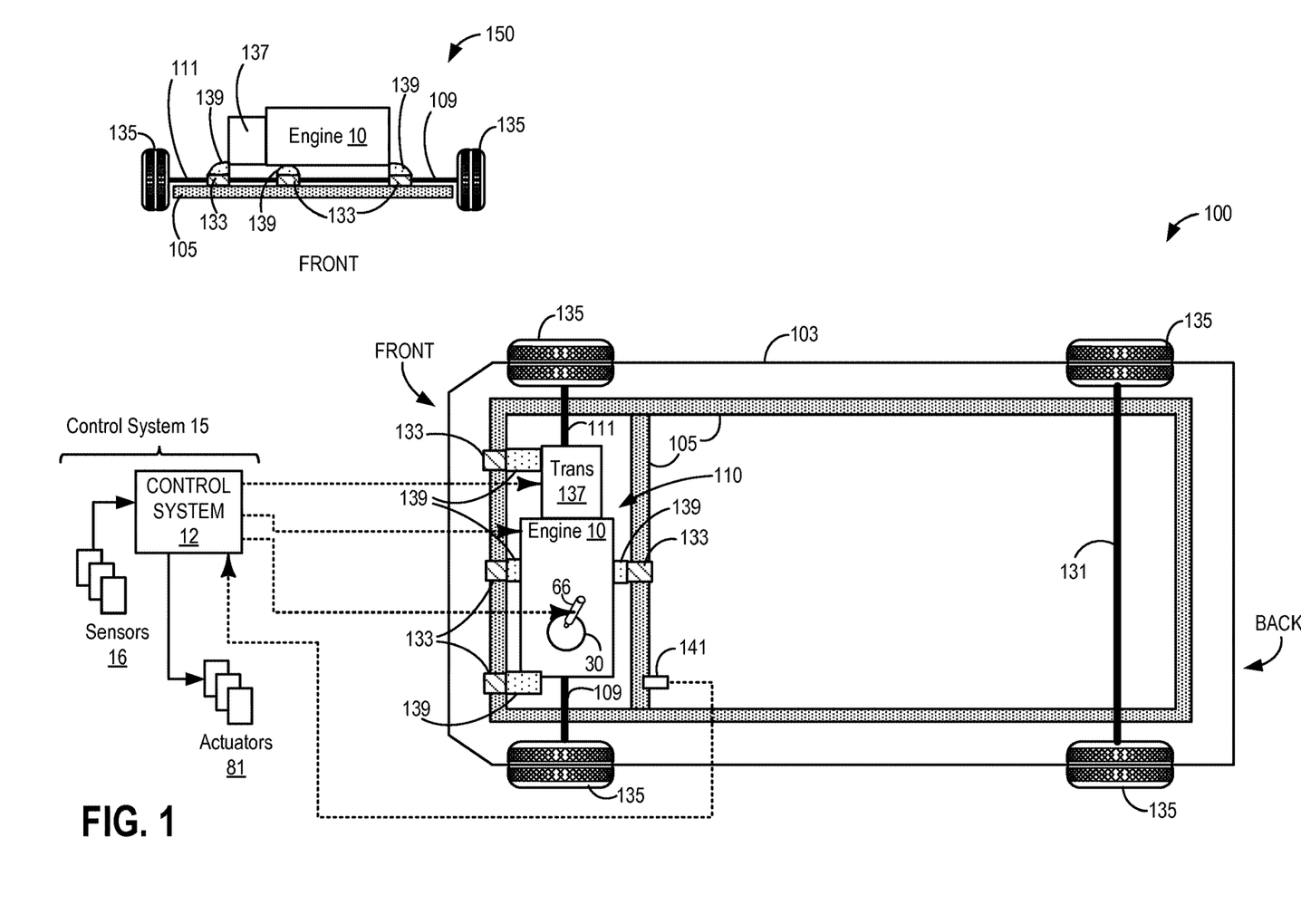
FIG. 1 schematically depicts an embodiment of a vehicle including a vehicle powertrain attached to a vehicle frame via a number of hydraulic mounts.

Turning now to FIG. 1, it schematically depicts an example vehicle system 100 as shown from a top view. Vehicle system 100 comprises a vehicle body 103 with a front end, labeled "FRONT", and a back end labeled "BACK." Vehicle system 100 may include a plurality of wheels 135. For example, as shown in FIG. 1, vehicle system 100 may include a first pair of wheels adjacent to the front end of the vehicle and a second pair of wheels adjacent the back end of the vehicle.

Vehicle system 100 may include an internal combustion engine, such as example engine 10, coupled to transmission 137. Engine 10 and transmission 137 may herein be referred to in combination as a vehicle powertrain 110 or a powertrain 110. It will be appreciated that other vehicle components coupled to one or more of engine and/or transmission 137 may also be included in the vehicle powertrain 110 without departing from the scope of the present invention. Vehicle system 100 is depicted as having a FWD transmission where engine 10 drives the front wheels via half shafts 109 and 111. In another embodiment, vehicle system 100 may have a RWD transmission which drives the rear wheels via a driveshaft (not shown) and a differential (not shown) located on rear axle 131.

Engine 10 and transmission 137 may be supported at least partially by frame 105, which in turn may be supported by plurality of wheels 135. As such, vibrations and movements from engine 10 and transmission 137 may be transmitted to frame 105. Frame 105 may also provide support to a body of vehicle system 100 and other internal components such that vibrations from engine operation may be transferred to an interior of the vehicle system 100. In order to reduce transmission of vibrations to the interior of vehicle system 100, engine 10 and transmission 137 may be mechanically coupled via a plurality of members 139 to respective hydraulic mounts 133. As depicted in FIG. 4, engine 10 and transmission 137 are mechanically coupled at four locations to members 139 and via members 139 to four hydraulic mounts 133. In other alternate embodiments, a different number of members and hydraulic mounts may be used, without departing from the scope of the present disclosure.

View 150 depicts a view of vehicle system 100 as observed from front end of vehicle system 100. As described earlier, control system 15 including controller 12 may at least partially control engine 10 as well as vehicle system 100. The controller 12 receives signals from the various sensors 12 of FIG. 1 and employs the various actuators 81 of FIG. 1 to adjust engine operation based on the received signals and instructions stored on a memory of the controller. In the depicted example, controller 12 may receive input data from vibration sensor 141. Vibration sensor 141, in one example, may be an accelerometer. It will be appreciated that vehicle 100 may include a number of additional vibrational sensors affixed to vehicle frame 105, engine 10, transmission 137, hydraulic mounts 133, etc. without departing from the scope of the present invention. Further, control system 15, and controller 12, can send control signals to actuators 81 which may include fuel injector 66 coupled to cylinder 30 in addition to other actuators of engine 10 and transmission 137 not depicted at FIG. 1. Controller 12 may receive input data from the various sensors, process the input data, and trigger the actuators in response to the processed input data based on instruction or code programmed therein corresponding to one or more routines.

With regard to vehicle system 100, NVH may arise during engine operation, transmission operation, during transitions in engine operating modes, etc. Additionally, NVH may arise as a result of driving over rough (e.g., uneven) surfaces. Hydraulic mounts 133 may be designed to dampen vehicle noise and vibrations across a broad range of frequencies, or alternatively may be designed to dampen specific ranges of vibrational frequencies. In this way, NVH arising from a number of different sources may each be dampened by a common hydraulic engine mount 133. Additionally, hydraulic mounts 133 may be configured to dampen vibrations across a range of vibration amplitudes. As one example, and as described in further detail with regard to FIGS. 3 and 6, hydraulic mounts 133 may dampen vibrations over a (e.g., threshold magnitude amplitudes) via a first dampening mechanism, and may dampen vibrations under a threshold magnitude (e.g., amplitude) via a second mechanism. The threshold magnitude may be determined based on the characteristics of components within the hydraulic mount. In this way, NVH may be reduced. However, in some examples, and as discussed in further detail with regard to FIG. 3, vehicle vibrations within a specified frequency range, and above a threshold magnitude, may result in collisions between internal components of a hydraulic mount 133.

Thus the a vehicle system is contemplated herein, comprising a vehicle frame, a plurality of wheels, a powertrain, comprising an internal combustion engine configured to convert chemical energy into torque and a transmission unit configured to transmit torque from the internal combustion engine to a number of the plurality of wheels, and at least one hydraulic engine mount mechanically coupling the powertrain to the vehicle frame. As described below a, fluidic de-coupler included within the hydraulic engine mount may comprise number of partially annular cavities formed therein.

One example advantage of the present invention is a hydraulic mount that reduces collisions between internal hydromount components and resultant vibrations thereof, herein also referred to as hydromount "clatter". Accordingly, FIGS. 2-3 respectively show a known hydromount housing and cross-sectional view thereof. For purposes of background, the hydraulic mount of FIGS. 2-3 will be briefly described although one skilled in the art will understand that the hydromount shown therein is but one design of a hydraulically damped powertrain mount that may incorporate the features of the present disclosure, and that the present application should not be limited to any one particular style of hydraulically damped mount.

Turning now to FIG. 2, it shows an external view of an example hydraulic mount 200. For example, hydraulic mount 200 may be an example of hydraulic mount 133 shown within vehicle system 100 at FIG. 1. When configured in a vehicle system that is on flat ground (e.g., vehicle system 100 at FIG. 1), hydraulic mount 200 may be oriented in a substantially vertical direction. However, in other configurations, hydraulic mount 200 may be oriented at an oblique angle relative to vertical. As used herein, however, the terms "upper" and "lower" may refer to respective ends of arrow 298, which indicates a directional axis specific to the hydromount. That is to say, arrow 298 provides reference for a relative positioning of components constituting hydromount 200, and not a reference for the orientation of hydromount 200 within a vehicle system. Additionally, an upper end of the hydromount may refer to the end closer toward the head of arrow 298 and a lower end of the hydromount may refer the end closer toward the tail of arrow 298.

Hydraulic mount 200 includes an upper external housing 202 with a central opening 212 formed within a top surface thereof. Upper external housing 202 may be formed from a rigid material, such as a metal or hard plastic. Central opening 212 is configured to receive a fastener or bolt 206, which extends outwardly from a main rubber element (not shown) for fastening to a component of the vehicle powertrain (e.g., one of engine 10 or transmission 137 at FIG. 1). Bolt 206 may be formed from a rigid material such as steel or aluminum. In some examples, the portion of bolt 206 that extends out of the An upper end of bolt 206 may be configured to rotate about the clearance of central opening 212, while the lower end (not shown) may be lodged in a main rubber element of the hydraulic mount, and as such the lower end of the bolt may remain relatively stationary compared to the upper end of the bolt. In another example, bolt 206 may extend outwardly from a bearing member (not shown) that is partially encapsulated within the main rubber element of the housing, and may be configured to transfer vibrations to the rubber element via the bearing member.

Bolt 206 may be coupled to a rigid upper bracket 239 via a fastener 240. It will be appreciated that upper bracket 239 may be similar to a member 139 described above with regard to FIG. 1. Upper bracket 239 may be formed from one of a metal or a hard plastic. A distal portion 238 of the upper bracket 239 may be coupled to a vehicle powertrain component (e.g., coupled to the powertrain component at a flange affixed thereto) via a fastener, in a manner generally known in the art.

Lower external housing 204 may be fastened (e.g., mechanically coupled) to upper housing 202. Lower housing 204 may be formed from a rigid material such as one of a metal or hard plastic. A coupling of the lower housing to a vehicle frame (e.g., 105 at FIG. 1) may be achieved via a plurality of lower brackets. In this way, the external housing may remain structurally rigid (e.g., substantially non-compressible), and any vibrations absorbed from the vehicle powertrain or vehicle frame may be transferred to a main rubber element within the external housing, said rubber element configured to dampen the vibrations.

Shown at FIG. 2 are first lower bracket 232 and second lower bracket 234. It will be appreciated that still further brackets may be affixed to lower housing 204 in a similar manner to brackets 232 and 234 without departing from the scope of the invention. The lower brackets may be formed from metal, such as steel. However, other materials may be used to form the lower brackets without departing from the scope of the present invention. First lower bracket 232 is shown integrally formed with lower housing 204. A bolt (not shown) may couple (e.g., mechanically) lower bracket 232 to a vehicle frame via hole 282. Second lower bracket 234 is shown affixed to, but not integrally formed with, lower housing 223.

Thus, a hydraulic engine mount as contemplated herein may include at least a rigid housing; a rigid support element coupled to a vehicle powertrain external to the housing at a first end; and an elastic support element within the housing, said elastic support element mechanically coupled to a second end of the rigid support element.

FIG. 3 shows a cross-sectional view 300 of a hydraulic mount (e.g., hydraulic mount 133 at FIG. 1 or hydraulic mount 200 at FIG. 2). As used herein, however, the terms "upper" and "lower" may refer to respective ends of arrow 398, as described with reference to arrow 298 at FIG. 2. It will be appreciated that arrow 398 may provide a reference for the relative positioning of components within the hydromount, as described above with reference to arrow 298.

A hydromount assembly may include an external housing 302 (e.g., similar to 202 at FIG. 2) dimensioned to receive a first or elastomeric component or main rubber element 304 that is generally shaped as a truncated cone, and primarily made of an elastomeric material, such as an elastic rubber as is conventional in the art. A fastener or bolt 306 (e.g., similar to 206 at FIG. 2) extends outwardly from the main rubber element for fastening to the powertrain or engine (not shown) in a manner generally known in the art. In the depicted example, bolt 306 with a metal bearing member 308 of which at least a lower portion encapsulated within the first elastomeric member 304. In addition, a lower peripheral portion of the main rubber element may include a stiffener, such as metallic stiffener 310, molded within the main rubber element to add rigidity and support. In this way, vibrations and/or displacements from the powertrain may be transferred to the first elastomeric member 304 of the hydraulic mount.

As discussed above with regard to FIG. 2, the main rubber element is received within the upper external housing 302 so that the bolt 306 extends through a central opening 312 in the restrictor. The lower surface 305 of the main rubber element 304 forms a portion of a first or upper fluid chamber 316, namely the high pressure side, of the engine mount. First fluid chamber 316 may be filled with a hydraulic fluid (e.g., glycol). The remainder of the first fluid chamber 316 is defined by the inertia track assembly 320, more specific details of which will be described below. It will be understood that inertia track assembly 320 may herein also be referred to as a partitioning structure. An outer radial portion of an upper surface of the partitioning structure (denoted by reference numeral 322) abuttingly and sealingly engages the main rubber element 304 in order to seal the first fluid chamber 316. A second outer radial portion along the lower surface denoted by reference numeral 324 is sealingly engaged by a rubber boot or diaphragm 330, and particularly an upper peripheral portion 332 thereof. Lower surface 324 of the partitioning structure 320, in combination with diaphragm 330, form a lower hydraulic chamber 350. Lower hydraulic chamber may too be filled with a hydraulic fluid (e.g., glycol). The diaphragm 330 is protected by a diaphragm cover 334, preferably formed of a more rigid material than the elastomeric diaphragm, and that matingly engages (e.g., mechanically couples to) the lower external housing 340. When the lower housing 340 is fastened to the upper housing, the lower peripheral edge of the main rubber element 304 and the peripheral portion 332 of the diaphragm sealingly engage opposite sides or faces 322, 324, respectively, of the partitioning structure 320.

It will be appreciated that the upper face of the partitioning structure may part of a first, upper plate 322 of the partitioning structure, and that the lower face may be part of a second, lower plate 324 of the partitioning structure. The first and second plates 322 and 324 may be matingly engaged to form the partitioning structure. Additionally, securely housed in the partitioning structure between the first and second faces 322 and 324 is a de-coupler 360, which may selectively seal a first fluidic coupling between the upper and lower chambers 316 and 350. As a specific example, a central opening (e.g., circular hole) of the de-coupler may be configured to accept a central protrusion 323 of the lower plate, and when the partition structure 320 is sealed, the upper plate 322 may be matingly coupled to the lower plate via a notch on the central protrusion, thereby securing the position of the de-coupler 360 within the partition structure. It will be appreciated, however, that when the de-coupler is secured, the vertical position of the de-coupler is not fixed. Instead, the vertical position of the de-coupler may be configured to be within a range of vertical positions spanning from the bottom surface of the upper partition plate 322 to the top surface of the bottom plate 324, as will be described below in further detail.

As vibrations or displacements are received into the mount from the powertrain and/or the vehicle frame, fluid is pumped from the first fluid chamber 316 through the partitioning structure 320 in different ways. The partitioning structure 320 is disposed between the first or upper fluid chamber 316 and the second or lower fluid chamber 350. Thus, the upper plate 322 of partitioning structure is associated with the high pressure side of the mount. On the other hand, the lower plate 324 of the partitioning structure is associated with the second or lower fluid chamber 350 and is sometimes referred to as the low pressure side of the mount. The fluid is pumped from the top to the bottom through the partitioning structure 320. The path that the fluid takes through the partitioning structure depends on the position of de-coupler 360.

More particularly, the de-coupler 360 is preferably a rubber or elastomeric disk or similar structural arrangement received between the upper surface 322 and the lower surface 324 of partitioning structure 320 as described above. A central portion of upper plate 322 includes a plurality of openings or holes 392 to allow fluid from upper chamber 316 to flow therethrough, and toward lower chamber 350. Similarly, a central portion of lower plate 324 includes a plurality of openings or holes 394 from which fluid may flow into the lower chamber 350. In combination, the openings 392 and holes 394 may comprise a first fluidic passage 390 coupling the upper and lower chambers 316 and 350. The first fluidic passage 390 may also be referred to herein as a first throttle passage. It will be appreciated, then, that de-coupler 360 is positioned within throttle passage 390. It will be further appreciated that the plurality of holes in the first fluidic passage 390 allows for a relatively low-resistance flow between the high pressure chamber 316 and the low pressure chamber 350 (e.g., lower than a flow resistance through passage 398 described below).

Alternatively, fluid may flow between the hydraulic chambers via a second path 398 within the partitioning structure. Second path 398 has an opening 396 along the top surface of upper plate 322. It will be appreciated that second path 398 may herein be referred to as second throttle passage 398. Specifically, high-pressure opening 396 may be at a position radially outward from (e.g., past) the radial extent of the de-coupler 360. Opening 396 allows fluidic communication between high pressure chamber 328 and an elongated (e.g., spiraling or serpentine) passage 398 that ultimately communicates with opening 397 through a lower surface of the partitioning structure. It will be appreciated that opening 397 enables fluidic communication between passage 398 and the second/lower fluid chamber 350.

Fluid only flows through this serpentine path 398, however, when the first fluidic passage 390 path is otherwise blocked. When first fluidic passage 390 is blocked, hydraulic fluid instead proceeds through the serpentine passage 398 to exit through opening 397 that communicates with the low pressure side 350 of the mount 300. As one example, a pressure differential across high pressure chamber 316 and low pressure chamber 350 may be great enough (e.g., above a threshold pressure) to press de-coupler 360 against the second plurality of holes, thereby sealing first fluidic passage 390. As another example, first fluidic passage 390 may be blocked or sealed when the de-coupler 360 is engaged in face-sharing contact with one of the plurality of openings 392 or 394 within the partition structure 320. To elaborate, when vibrations received by hydromount 300 are above a threshold magnitude (e.g., a threshold vibrational amplitude), vibrations absorbed by de-coupler may impel a surface of the de-coupler against one of the pluralities of holes 392 or 394. As a specific example, the de-coupler may oscillate between engaging in face-sharing contact with the central openings of lower partition plate 324 and engaging in face-sharing contact with the corresponding openings of upper partition plate 322 as a result of absorbing the high-amplitude vibrations. For higher input displacements, then, the fluid may be forced through the low frequency inertia track.

As the motion of the de-coupler 360 within the partitioning structure 320 increases, more collisions (e.g., physical contact) may occur between the de-coupler and the partition plates. These collisions may result in noises herein referred to as clatter or clattering. Such collisions may increase the NVH of the hydromount, thereby decreasing user satisfaction. Additionally, the clattering may degrade the dampening capabilities of the hydromount due to the unpredictable positioning of the de-coupler within the partitioning structure 320.

While larger vibrational amplitudes of the working fluid (e.g., resulting from higher input displacements) are understood in the art to be a cause of hydromount clatter, the inventors herein have recognized that specific vibrational frequencies or frequency ranges may especially induce clatter. That is to say, within a number of specific frequency ranges, vibrations of an amplitude lower than the above-referenced threshold amplitude may induce hydromount clatter. As a specific, vibrational frequencies within first and second resonance ranges of the de-coupler may further increase the motion of the de-coupler 360 relative to the partition plates 322 and 324. As an example, the first vibrational frequency or range of frequencies may correspond with an in-plane vibrational resonance of the de-coupler, and the second vibrational range of frequencies may correspond to an out-of-plane vibrational resonance of the de-coupler. Absorbing the vibrations at the in-plane and out-of-plane resonances may result in increased motion of the de-coupler 360.

It will be appreciated that vibrational resonances may be more pronounced in generally symmetric (e.g., with regard to mass distribution) objects such as a typical hydromount de-coupler. However, it may be desirable to maintain a symmetric de-coupler design in order to increase the uniformity of hydraulic flow between high pressure chamber 316 and low pressure chamber 350 of the hydraulic mount. Thus, FIGS. 4-5 show a de-coupler 460 designed for a reduced response to resonant vibrational frequencies while maintaining a generally symmetric design.

Turning now to FIG. 4, it shows a perspective view of an example hydromount de-coupler 460. De-coupler 460 may be substantially similar to de-coupler 360 at FIG. 3. Additionally, de-coupler 460 may be formed from an elastic material such as rubber. While the structural details of only a first (e.g., obverse) face 462 of the de-coupler are shown at view 400, it will be appreciated that de-coupler 460 may include a second (e.g., reverse) face 464 including identical structural features. It will also be appreciated that arrow 498 indicates an axial direction of the de-coupler. To elaborate, the axial direction 498 may be perpendicular to the plane generally occupied by the de-coupler. Thus, directions perpendicular to arrow 498 may be referred to as radial directions. When de-coupler 460 is included in a hydraulic mount, the axial direction 498 may align with a vertical direction of the hydraulic mount (e.g., as indicated by arrow 398 at FIG. 3).

An axial extent of de-coupler 460 is indicated at 402. It will be appreciated that, absent the presence of structural features such as the annular beads and radial nodes described below, axial extent 402 may be uniform across the de-coupler 460. In other words, axial extent 402 may be a minimum axial extent of the de-coupler.

De-coupler 460 includes a circular central opening 406. It will be appreciated that central opening 406 may be configured to accept a notch of the lower partition plate within a hydromount partitioning structure, as shown and described above at FIG. 3.

Each face of de-coupler 460 may include an inner plurality of annular beads 412. Annular beads 412 may be raised structural features formed integrally with the de-coupler body. By including a plurality of annular beads on each face of the de-coupler, improved damping performance may be achieved.

Further from the inner plurality of annular beads (e.g., radially further from the central opening 406 of de-coupler) are a plurality of radial nodes 422. Nodes 422 may be generally capsule-shaped, and the major axis of each node may be aligned with a radial direction of the de-coupler (e.g., along an axis extending from the center of the de-coupler to a point along the outer circumference of the de-coupler). It will be appreciated that the angular positions of nodes 422 may be evenly distributed at common radial distance from the geometric center of de-coupler 460 (e.g., along a common inner circumference). Nodes 422 may separate the inner plurality of annular beads 412 from an outer plurality of annular beads described below. By including a plurality of radial nodes 422 on each face of the de-coupler, improved damping performance may be achieved.

De-coupler 460 may further include an outer plurality of annular beads comprising each of an outermost annular bead 415 and a remainder portion 414 of outer annular beads. In one example, as shown at FIG. 4, the remainder portion 414 may include two annular beads. In one example, the outermost annular bead 415 may have a greater axial extent than the remainder portion of beads 414. To elaborate, the remainder portion of outer beads 414 may have the same axial extent (e.g., the beads may be raised from axial extent 402 by the same amount). The outermost bead 415 extends along the outermost circumference of de-coupler 460. It will be appreciated that the functional advantages of the outer plurality of annular beads are similar to those of the inner plurality of annular beads 412.

Radial extents 417 and 419 may indicate respective separation distances between two beads 414 and between the last of the remainder beads 414 and the outermost annular bead 415. Each bead included in the remainder portion 414 may be separated by a radial extent 417, and radial extent 419 may separate the outermost annular bead 415 from the remainder portion of annular beads 414. As described in further detail with regard to FIGS. 5A and 5B, de-coupler 460 may encase a plurality of partially annular cavities, and the radial extent of each partially annular cavity may span radial extent 419. As one example, radial extent 419 may be 2 millimeters. Thus, the plurality of partially annular cavities may be a common radial position between the outermost bead (e.g., 415) and a remainder number of the outer plurality of annular beads (e.g., 414).

Thus, a de-coupler for a hydraulic engine mount as contemplated herein may include first and second faces each comprising: a central opening, an inner plurality of annular beads, an outer plurality of annular beads, said outer plurality including an outermost bead at the radial extent of the de-coupler, and a number of circumferentially arranged nodes at a radial position between the inner plurality and outer plurality of annular beads.

Turning now to FIG. 5A, it shows a top-down view of a de-coupler 560 that depicts a plurality of partially annular cavities distributed along a common circumference of the de-coupler. It will be appreciated that de-coupler 560 may be similar to de-couplers 460 and 360. It will be further appreciated that cross-section VB indicates a viewing angle as depicted at FIG. 5B.

As shown at FIG. 5A, first and second partially annular cavities 530a and 530b of de-coupler 560 may be positioned at a common radial position and at diametrically opposite first and second angular positions. Specifically, each partially annular cavity may be included within the de-coupler body 560 at a common radial position 509 between the outermost bead 515 and a remainder number of the outer plurality of annular beads 514. It will be understood that the radial extent 509 begins at the center of central opening 506 and extends radially outward therefrom.

Additionally, in some examples, de-coupler 560 may further include a third partially annular cavity 530c at an angular position that bisects the arc spanning the first and second annular cavity positions. Third partially annular cavity may be radially positioned along the common circumference of cavities 530a and 530b, at an angular position halfway between the diametrically opposed first and second partially annular cavities. It will be appreciated that each partially annular cavity 530a-c may be geometrically congruent to one another. As an example, an angular extent 504 (e.g., an arc length) of each partially annular cavity may be the same magnitude. It should be appreciated that the areas indicated as not having the annular cavity do not have an annular cavity in one example. Further, in one example, the de-coupler only has the first, second, and/or third cavities and no other cavities. As an example, the cavities may enclose one or more materials, such as a metal filler, such that no voids remain in the cavities.

As another example, the de-coupler 560 includes a circular body and a plurality of partially annular cavities 530a-c are positioned entirely within the circular body at a common radial position (e.g., radial position 509 of de-coupler 560). Specifically, the de-coupler 560 may include at least a first partially annular cavity 530a positioned within the circular body at a first angular position, and a second partially annular cavity 530b positioned within the circular body at a second angular position, said second angular position diametrically opposed to the first angular position. In some examples, the de-coupler may further include a third partially annular cavity 530c, said third cavity 530c positioned at an angular position halfway between the first and second cavities. That is to say, third cavity 530c may be positioned 90 degrees from each of the first and second cavities 530a and 530b. In this way, by including a third partially annular cavity, the vibrational response to resonant frequencies may be reduced.

Turning now to FIG. 5B, it provides a cross-sectional view of de-coupler 560, and depicts the axial and radial dimensions of the cavities 530. As shown, the angular extent of each cavity 530 (e.g., as indicated by arrow 504 at FIG. 5A) may be greater is greater than a radial extent 505 of each cavity. As a specific example, the angular extent or arc length of each cavity may be 10 millimeters, and the radial extent may be 2 millimeters. However, annular cavities of other dimensions and/or relative dimensional proportions may be encased within de-coupler 560 without departing from the scope of the present invention.

The axial extent 503 of each annular cavity is less than the axial extent 502 of the de-coupler. It will be appreciated that axial extent 502 is similar to axial extent 402 of de-coupler 460. As one example, axial extent 503 may be one-half the magnitude of axial extent 502. As a specific example, axial extent 503 may be 1.5 millimeters, and axial extent 502 may be 3 millimeters. Additionally as shown, the radial extent 505 of each cavity is greater than an axial extent 503 of each cavity.

It will be appreciated that in some examples, the depiction of de-coupler 560 at FIGS. 5A-5B may include a plurality of partially annular metal inserts 532a-532c flushly housed within respective partially annular cavities 530a-530c. Specifically, the metal inserts may be sized such that they are flushly housed within the cavities 530a-530c. Put another way, each metal insert may be geometrically congruent to the space vacated in the de-coupler by one of the plurality of partially annular cavities 530a-530c. As such, the above-referenced example dimensions may be common between each cavity and each metal insert. As one example, the inserts may be formed from aluminum. However, it will be appreciated that inserts 532a-532c may be formed from a different material without departing form the scope of the present invention. For example, a material may be chosen based on the estimated resonant frequencies of the de-coupler 560.

By including metal inserts 532 within the annular cavities 530, the stiffness (e.g., resistance to shear stress) of the de-coupler may be modified. Specifically, by including the metal inserts, the stiffness of the de-coupler may be increased. By modifying the stiffness of the de-coupler, improved damping may be achieved, thereby reducing the intensity of resonant vibrational modes within the de-coupler.

Thus, by way of the design features of de-coupler 560 described above, a mass distribution within the de-coupler may be modified, thereby reducing the magnitude of responses of the de-coupler resultant from absorbing resonant vibrational frequencies.

The above-referenced clatter-reduction advantages achieved by the design of de-coupler 560 may be represented by traces 610, 620, and 630 of plot 600 at FIG. 6. As indicated below plot 600, trace 610 is depicted by a solid line, trace 620 by a dotted line, and trace 630 by a dashed-dotted line. Specifically, plot 600 at FIG. 6 illustrates a de-coupler velocity spectrum as a function of a driving frequency.

To elaborate, the X axis represents a driving frequency of the de-coupler (e.g., in units of hertz), and the frequency increases in the direction of the arrow. It will be appreciated that the driving of the de-coupler may be along the axial dimension of the de-coupler, or alternatively may be in a direction of the horizontal plane of the de-coupler. As a first example, traces 610, 620, and 630 may represent velocity spectrums resulting from the driving of de-couplers that are installed within an engine hydromount (e.g., hydromount 300 at FIG. 3). In the first example, the de-couplers may be driven by vibrations of the working fluid included in the hydromount. As a second example, traces 610, 620, and 630 may represent velocity spectrums resulting from the driving of de-couplers that are isolated (e.g., in a bench-top test), and the de-coupler may be driven directly from a specialized actuator. It will be appreciated that in any example, the driving amplitude of the de-coupler may be constant across the frequencies depicted by the X axis. As specific examples, traces 610, 620, 630 may represent the velocity spectrums of de-couplers driven via vibrations of a 2 millimeter peak-to-peak magnitude or of an 8 millimeter peak-to-peak magnitude.

Frequencies f0-f5 represent frequencies of interest. Specifically, f0 may represent 0 hertz (e.g., no driving). Frequency f1 may represent a low-frequency driving force that impels motion within the de-coupler outside of the resonant modes of the de-coupler. The frequencies between f2 and f3 may represent a first range of resonant frequencies for the de-coupler, and the frequencies between f4 and f4 may represent a second range of resonant frequencies for the de-coupler (as indicated by an increase in de-coupler velocity within said ranges). For example, frequencies between f2 and f3 may excite a lower-energy resonant mode of the de-coupler, and frequencies between f4 and f5 may excite a higher-energy resonant mode of the de-coupler.

Further, the Y axis represents a de-coupler velocity that is resultant from the driving frequency, with velocity increasing in the direction of the arrow. Specifically, the de-coupler velocity may be a scalar value representing the magnitude of velocity along a specified axis, and not the direction of the velocity along said axis. As one example, the de-coupler may be driven along its axial dimension, and the velocities may be a maximum measured value of translational or rotational velocities in the horizontal plane of the de-coupler (i.e., the driving of the de-coupler may energize an in-plane resonant mode of the de-coupler). As another example, the de-coupler may be driven in a horizontal direction, and the velocities represented by the Y axis may be a maximum measured value of movement along the axial dimension of the de-coupler (i.e., the driving of the de-coupler may energize an out-of-plane resonant mode of the de-coupler). As an example, the velocity may be measured in millimeters per second.

Still further, horizontal line 602 may represent a threshold velocity. Specifically, threshold velocity 602 may represent a velocity above which the energy within the de-coupler is known to result in audible hydromount clatter when the de-coupler collides with its housing (e.g., one of the plates of the partitioning structure shown at FIG. 3). As another example, de-coupler velocities above threshold 602 may represent velocities wherein resultant hydromount clatter is considered undesirable, and velocities below threshold 602 may represent velocities wherein resultant hydromount clatter that is undetectable from a passenger compartment of a vehicle.

Trace 610 may represent the velocity spectrum of a de-coupler that does not include any of the annular cavities or metallic inserts taught herein. Put another way, trace 610 may represent clattering of a de-coupler that has not been modified according to the present invention.

In a first example, trace 620 represents the velocity spectrum of a de-coupler including first and second partially annular cavities at diametrically opposite positions (e.g., cavities 530a and 530b at FIG. 5A), and trace 630 includes a third partially annular cavity at an angular position halfway between the first and second annular cavities. In this first example, plot 600 may indicate the reduction of hydromount clatter that is achieved by increasing the number of partially annular cavities encased within the de-coupler (e.g., as described above with reference to FIGS. 5A-5B).

In a second example, trace 620 may represent the velocity spectrum of a de-coupler including a number partially annular cavities (e.g., two or three, as positioned at FIG. 5A), and trace 630 may represent the velocity spectrum of the de-coupler of trace 620, further comprising flushly housed metal inserts within each of the number of annular cavities (e.g., inserts 532 shown at FIG. 5A). In this second example, plot 600 may indicate the reduction of hydromount clatter resultant from the annular cavities (e.g., the difference between traces 610 and 620), and plot 600 may indicate the further reduction of hydromount clatter resultant from including metallic inserts within said cavities (e.g., the difference between trace 630 and 620).

Still other configurations of partially annular cavities and respective metallic inserts may be represented by each of traces 620 and 630 without departing from the scope of the present invention. That is to say, although not explicitly depicted herein, still further configurations of cavity number and metallic inserts may reduce the response of the de-coupler to resonant frequencies, thereby reducing hydromount clatter.

Turning now to plot 600, frequency f1 may represent a vibrational frequency that impels motion within the de-coupler without exciting a resonant mode of the de-coupler. As such, peak 611 of trace 610 and peak 621 of trace 620 may be aligned. That is to say, the addition of partially annular cavities to the de-coupler may not reduce clatter associated with motion of the de-coupler impelled by frequencies outside of the resonant frequency ranges of the de-coupler. However, peak 631 of trace 630 is shown at a lower velocity. As one example, an increase of de-coupler inertia resulting from the inclusion of metallic inserts within the de-coupler may result in a lower peak velocity 631 at driving frequency f1. It will be appreciated that the reduced velocity of peak 631 may still be above the threshold velocity 602.

The frequencies between frequency f2 and frequency f3 may represent a first resonant frequency range of a circular de-coupler. As such, the trace 610 may include peak 612 that is above threshold velocity 602. Conversely, traces 620 and 630 may include respective peaks 622 and 632 that are below threshold velocity 602. Specifically, peak 622 may represent at a first greater velocity below threshold velocity 602, and peak 632 may represent a second, lesser velocity below threshold velocity 602. Thus trace 620 indicates that the de-coupler response to frequencies within the first resonant range may be reduced by a first amount, and trace 630 indicates de-coupler response reduced by a second amount. In one example, frequency f2 may be 200 hertz, and frequency f3 may be 300 hertz.

The frequencies between frequency f4 and frequency f5 may represent a second resonant frequency range of a circular de-coupler. As such, the trace 610 may include peaks 614 and 616 that are each above threshold velocity 602. Conversely, traces 620 and 630 may include respective peaks 624, 626 and 634, 646 that are all below threshold velocity 602. Thus, by modifying the de-coupler to include a plurality of partially annular cavities and/or metallic inserts, hydromount clatter in the resonant frequency ranges of the de-coupler may be reduced. Similar to the clatter reduction depicted within the first resonance range f2-f3, trace 620 indicates a first, lesser amount of clatter reduction, and trace 630 indicates a second, greater amount of clatter reduction. In one example, frequency f4 may be 400 hertz, and frequency f5 may be 600 hertz.

As one example, the reduction of velocity may include a redistribution of energy across a wider resonant peak. That is to say, the integrated values of traces 630, 620, and 610 across a common resonant range of the de-coupler (e.g., one of f2-f3 or f4-f5) may be equivalent. In another example, however, the reduction of velocity below the threshold velocity may include a reduction of resonant response across the entire resonant range. That is to say, the integrated value of either of traces 620 or 630 across a common resonant frequency range may be less than that of trace 610.

Thus, the technical effect of including partially annular cavities encased within a hydromount de-coupler is to reduce the clatter associated with collisions between the de-coupler and a partitioning structure of the hydromount. Additionally, the technical effect of including metallic inserts within said cavities is to further reduce hydromount clatter.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

In a first example, the present invention contemplates a hydraulic engine mount, comprising: a high pressure working chamber and a low pressure compensating chamber with a partitioning structure coupled therebetween, a throttle passage coupling the working chamber and the compensating chamber, and a fluidic de-coupler positioned within the throttle passage and housed between first and second plates and including a plurality of discrete, partially annular cavities encased therein and located along a common circumference. In a first embodiment, the hydraulic engine mount of the first example includes wherein each of the number of partially annular cavities includes a metal insert flushly housed therein. In a second embodiment, which optionally includes the first embodiment, the hydraulic engine mount of the first example further comprises wherein the partitioning structure includes a first partitioning plate adjacent to the working chamber and a second partitioning plate adjacent to the compensating chamber; wherein the de-coupler is secured between the first and second partitioning plates via a central opening of the de-coupler; and wherein the common circumference is between the central opening and an outermost radial extent of the de-coupler. In a third embodiment, which optionally includes one or more of the first and second embodiments, the hydraulic engine mount of the first example further comprises wherein the number of cavities includes at least a first cavity and a second cavity, and wherein the first cavity is positioned at a diametrically opposite angular position from the second cavity. In a fourth embodiment, which optionally includes one or more of the first through third embodiments, the hydraulic engine mount of the first example further comprises a third cavity positioned 90 degrees from the first cavity.

In a second example, the present invention contemplates an engine mount, comprising a rigid housing; a rigid support element coupled to a vehicle powertrain external to the housing at a first end; an elastic support element within the housing, said elastic support element mechanically coupled to a second end of the rigid support element; a first chamber filled with a hydraulic fluid and partially defined by the elastic support element; a second chamber filled with the hydraulic fluid and partially defined by the elastic housing, said second chamber in selective fluidic communication with the first chamber via a valve assembly. In a first embodiment of the second example, the valve assembly includes: a first partition plate partially defining to the first chamber, a second partition plate partially defining the second chamber and mechanically coupled to the first partition plate, and a hydraulic channel fluidically coupling the first and second chambers via each of the first partition plate, the second partition plate, and a fluidic de-coupler positioned between the partition plates. In the first embodiment, the de-coupler includes a circular body and a plurality of partially annular cavities positioned entirely within the circular body at a common radial position. In a second embodiment of the second example, which optionally includes the first embodiment, the plurality of annular cavities comprises: a first partially annular cavity positioned within the circular body at a first angular position; and a second partially annular cavity positioned within the circular body at a second angular position, said second angular position diametrically opposed to the first angular position. In a third embodiment of the second example, which optionally includes one or more of the first and second embodiments, the plurality of annular cavities further comprises a third partially annular cavity positioned at an angular position halfway between the first and second cavities. In a fourth embodiment of the second example, which optionally includes one or more of the first through third embodiments, the de-coupler includes first and second faces each comprising: a central opening, an inner plurality of annular beads, an outer plurality of annular beads, said outer plurality including an outermost bead at the radial extent of the de-coupler, and a number of circumferentially arranged nodes at a radial position between the inner plurality and outer plurality of annular beads. In a fifth embodiment of the second example, which optionally includes one or more of the first through fourth embodiments, the engine mount further comprises wherein the plurality of partially annular cavities are included within the de-coupler body at a common radial position between the outermost bead and a remainder number of the outer plurality of annular beads. In a sixth embodiment of the second example, which optionally includes one or more of the first through fifth embodiments, the engine mount includes wherein each partially annular cavity is geometrically congruent to a remainder number of partially annular cavities. In a seventh embodiment of the second example, which optionally includes one or more of the first through sixth embodiments of the second example, the engine mount further comprises wherein an angular extent of each partially annular cavity is greater than a radial extent of each cavity, and wherein the radial extent of each cavity is greater than an axial extent of each cavity. In an eight embodiment, which optionally includes one or more of the first through seventh embodiments, the example engine mount includes wherein the axial extent of each annular cavity is one-half of an axial extent of the de-coupler. In a ninth embodiment, which optionally includes one or more of the first through eight embodiments, the engine mount of the second example further comprises a plurality of metal inserts flushly housed within the plurality of partially annular cavities. In a tenth embodiment, which optionally includes one or more of the first through ninth embodiments, the engine mount of the second example further comprises wherein each of the plurality of metal inserts is an aluminum inserts.

In a third example, the present invention contemplates a vehicle system, comprising: a vehicle frame; a plurality of wheels; a powertrain, comprising an internal combustion engine configured to convert chemical energy into torque and a transmission unit configured to transmit torque from the internal combustion engine to a number of the plurality of wheels; and at least one hydraulic engine mount mechanically coupling the powertrain to the vehicle frame, said hydraulic engine mount including a fluidic de-coupler with a number of partially annular cavities formed therein. In a first embodiment of the third example, the vehicle system further comprises wherein the hydraulic engine mount is configured to reduce the magnitude of vibrations across a number of discrete frequency ranges. In a second embodiment of the third example, which optionally includes the first embodiment, the vehicle system further comprises wherein each of the number of partially annular cavities flushly houses a metallic insert. In a third embodiment of the third example, which optionally includes one or more of the first and second embodiments, the vehicle system further comprises wherein the number of partially annular cavities includes first and second annular cavities positioned at a common radial position and at diametrically opposite first and second angular positions. In a fourth embodiment of the third example, which optionally includes one or more of the first through third embodiments, the vehicle system further comprises wherein the number of partially further includes a third annular cavity at an angular position that bisects the arc spanning the first and second annular cavity positions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hydraulic engine mount, comprising:
a high pressure working chamber and a low pressure compensating chamber with a partitioning structure coupled therebetween,
a first throttle passage coupling the working chamber and the compensating chamber,
a second, serpentine throttle passage coupling the working chamber to the compensating chamber,
the partitioning structure including first and second partitioning plates,
a fluidic de-coupler positioned on a protrusion of the first or second partitioning plate within the first throttle passage and the fluidic de-coupler movably coupled to the protrusion such that the fluidic de-coupler slides along the protrusion between a first position in face sharing contact with the first partitioning plate and a second position in face sharing contact with the second partitioning plate, and
the fluidic de-coupler including a plurality of discrete, internal cavities with a partially annular shape located along a common circumference, the plurality of internal cavities reducing a velocity of the fluidic de-coupler sliding along the protrusion between the first and second positions, and a material or lack of material within the internal cavities is based on estimated resonant frequencies of the fluidic de-coupler.

2. The hydraulic engine mount of claim 1, wherein each of the plurality of internal cavities includes a metal insert flushly housed therein, the metal inserts having a partially annular shape and extending along the common circumference, and the metal inserts further reducing the velocity of the sliding along the protrusion.

3. The hydraulic engine mount of claim 2,
wherein the partitioning structure includes the first partitioning plate adjacent to the working chamber and the second partitioning plate adjacent to the compensating chamber;
wherein the fluidic de-coupler is secured between the first and second partitioning plates via a central opening of the de-coupler which slides along the protrusion between the first position in face-sharing contact with openings of the first partitioning plate and the second position in face-sharing contact with openings of the second partitioning plate; and
wherein the common circumference is between the central opening and an outermost radial extent of the fluidic de-coupler.

4. The hydraulic engine mount of claim 3, wherein the plurality of internal cavities includes at least a first cavity and a second cavity, and wherein the first cavity is positioned at a diametrically opposite angular position from the second cavity.

5. The hydraulic engine mount of claim 4, further comprising a third cavity positioned 90 degrees from the first cavity such that the third cavity increases asymmetry of a mass distribution.

6. An engine mount, comprising:
a rigid housing;
a rigid support element coupled to a vehicle powertrain external to the housing at a first end;
an elastic support element within the housing, said elastic support element mechanically coupled to a second end of the rigid support element;
a first chamber filled with a hydraulic fluid and partially defined by the elastic support element; and
a second chamber filled with the hydraulic fluid and partially defined by the elastic support element, said second chamber in selective fluidic communication with the first chamber via a valve assembly;
wherein the valve assembly includes:
a first partition plate partially defining the first chamber,
a second partition plate partially defining the second chamber and mechanically coupled to the first partition plate via a central protrusion of the second partition plate, and
a hydraulic channel fluidically coupling the first and second chambers via each of the first partition plate, the second partition plate, and a fluidic de-coupler movably coupled to a protrusion such that the fluidic de-coupler slides along the protrusion between a first position with a center of the fluidic de-coupler contacting the first partition plate and a second position with the center of the fluidic de-coupler contacting the second partition plate;
wherein the fluidic de-coupler includes a circular body and a plurality of discrete, internal cavities having a partially annular shape and positioned entirely within the circular body at a common radial position, and the plurality of internal cavities reducing velocities of the fluidic de-coupler sliding between the first and second positions at one or more resonant frequencies of the fluidic de-coupler by a greater amount than at other frequencies.

7. The engine mount of claim 6, wherein the plurality of internal cavities comprises:
a first internal cavity positioned within the circular body at a first angular position;
a second internal cavity positioned within the circular body at a second angular position, said second angular position diametrically opposed to the first angular position; and
wherein the one or more frequencies are resonant frequencies that produce a velocity above a velocity threshold.

8. The engine mount of claim 7, wherein the plurality of internal cavities further comprises a third internal cavity positioned at an angular position halfway between the first and second internal cavities, the third internal cavity increasing asymmetry of a mass distribution.

9. The engine mount of claim 8,
wherein the fluidic de-coupler includes first and second faces each comprising:
a central opening which contacts the first partition plate in the first position and the second partition plate in the second position,
an inner plurality of annular beads, an outer plurality of annular beads, said outer plurality of annular beads including an outermost bead at a radial extent of the fluidic de-coupler, and a number of circumferentially arranged nodes at a radial position between the inner and outer pluralities of annular beads.

10. The engine mount of claim 9, wherein the plurality of internal cavities is included within the fluidic de-coupler at a common radial position between the outermost bead and a remainder number of the outer plurality of annular beads.

11. The engine mount of claim 10, wherein each internal cavity is geometrically congruent to a remainder number of the internal cavities.

12. The engine mount of claim 11, wherein an angular extent of each internal cavity is greater than a radial extent of each internal cavity, and wherein the radial extent of each internal cavity is greater than an axial extent of each internal cavity.

13. The engine mount of claim 12, wherein the axial extent of each internal cavity is one-half of an axial extent of the fluidic de-coupler.

14. The engine mount of claim 13, further comprising a plurality of metal inserts flushly housed within the plurality of internal cavities, the metal inserts having a partially annular shape extending along a common circumference, and the metal inserts further reducing the velocities of the fluidic de-coupler sliding between the first and second positions in response to the one or more frequencies.

15. The engine mount of claim 14, wherein each of the plurality of metal inserts is an aluminum insert.

16. An engine mount, comprising:

a rigid housing;

a rigid support element coupled to a vehicle powertrain external to the housing at a first end;

an elastic support element within the housing, said elastic support element mechanically coupled to a second end of the rigid support element;

a first chamber filled with a hydraulic fluid and partially defined by the elastic support element; and a second chamber filled with the hydraulic fluid and partially defined by the elastic support element, said second chamber in selective fluidic communication with the first chamber via a valve assembly;

wherein the valve assembly includes:

a first partition plate partially defining the first chamber, a second partition plate partially defining the second chamber and mechanically coupled to the first partition plate, and a hydraulic channel fluidically coupling the first and second chambers via each of the first partition plate, the second partition plate, and a fluidic de-coupler coupled to a protrusion such that the fluidic de-coupler slides between face sharing contact with the first and second partition plates;

wherein the fluidic de-coupler includes a circular body and a plurality of discrete, internal cavities positioned entirely within the circular body at a common radial position and having an annular shape, and the plurality of internal cavities reducing a velocity of the sliding of the fluidic de-coupler at one or more resonant frequencies of the de-coupler by a greater amount than at other frequencies;

wherein the plurality of internal cavities comprises:

a first internal cavity positioned within the circular body at a first angular position; and a second internal cavity positioned within the circular body at a second angular position, said second angular position diametrically opposed to the first angular position;

wherein the plurality of internal cavities further comprises a third internal cavity positioned at an angular position halfway between the first and second internal cavities; and wherein the fluidic de-coupler includes first and second faces contacting the hydraulic fluid, each comprising:

a central opening, an inner plurality of annular beads, an outer plurality of annular beads, said outer plurality of annular beads including an outermost bead at a radial extent of the fluidic de-coupler, and a number of circumferentially arranged nodes at a radial position between the inner and outer pluralities of annular beads;

wherein the plurality of internal cavities is included within the fluidic de-coupler at a common radial position between the outermost bead and a remainder number of the outer plurality of annular beads.

17. The hydraulic engine mount of claim 1, wherein the fluidic de-coupler includes a plurality of annular rings which decrease uniformity of a mass distribution in a radial direction.

18. The hydraulic engine mount of claim 17, wherein the fluidic de-coupler includes a plurality of nodes in a symmetric arrangement and the nodes decrease uniformity of the mass distribution.

19. The hydraulic engine mount of claim 3, wherein the metal inserts reduce the velocity by modifying a vibrational resonance of the fluidic de-coupler.

20. The hydraulic engine mount of claim 16, wherein the plurality of internal cavities reduces a velocity of the fluidic de-coupler sliding between face sharing contact with the first and second partition plates and metal inserts in the internal cavities further reduce the velocity.

* * * * *